United States Patent
Leng et al.

(10) Patent No.: US 10,187,195 B2
(45) Date of Patent: Jan. 22, 2019

(54) CONTROLLER AREA NETWORK SYNCHRONIZATION

(71) Applicant: HAMILTON SUNDSTRAND CORPORATION, Charlotte, NC (US)

(72) Inventors: Qiuming Leng, South Barrington, IL (US); Julie Truong, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 4 days.

(21) Appl. No.: 15/141,044

(22) Filed: Apr. 28, 2016

(65) Prior Publication Data

US 2017/0317812 A1  Nov. 2, 2017

(51) Int. Cl.
*H04L 7/00* (2006.01)
*H04J 3/06* (2006.01)
*H04L 12/40* (2006.01)

(52) U.S. Cl.
CPC .......... *H04L 7/0037* (2013.01); *H04J 3/0641* (2013.01); *H04J 3/0652* (2013.01); *H04L 12/40* (2013.01); *H04L 2012/40215* (2013.01)

(58) Field of Classification Search
CPC ................... H04L 7/0037; H04L 12/40; H04L 2012/40215
See application file for complete search history.

(56) References Cited

U.S. PATENT DOCUMENTS

| 5,402,394 | A | * | 3/1995 | Turski | G06F 1/14 368/10 |
| 6,111,888 | A | * | 8/2000 | Green | H04J 3/0652 370/447 |
| 6,199,169 | B1 | * | 3/2001 | Voth | G06F 1/14 709/248 |
| 9,727,519 | B2 | * | 8/2017 | Randell | G06F 13/4282 |
| 9,756,590 | B2 | * | 9/2017 | Koenigseder | H04W 56/0025 |
| 2001/0018720 | A1 | | 8/2001 | Weigl | |
| 2002/0169844 | A1 | * | 11/2002 | Jammes | H04L 12/40163 709/207 |
| 2003/0214953 | A1 | * | 11/2003 | Ei-Demerdash | H04L 12/403 370/400 |
| 2005/0055469 | A1 | * | 3/2005 | Scheele | H04J 3/0664 713/375 |

(Continued)

OTHER PUBLICATIONS

Fuehrer T et al: "Time Triggered Communication on CAN (Time Triggered CAN—TTCAN)", Proceedings of the International CAN Conference, Jan. 1, 2000 (Jan. 1, 2000), pp. 1-07, XP002905415.

(Continued)

*Primary Examiner* — Steven H Nguyen
(74) *Attorney, Agent, or Firm* — Cantor Colburn LLP (57) ABSTRACT

A computer-implemented method for synchronizing nodes on a controller area network includes identifying, via a processor, a node from a plurality of nodes as a sync master node; designating, via the processor, each of the remaining nodes as a sync slave node; designating, via the processor, the first message from the sync master node as a sync message; assigning, via the processor, the lowest number, among all the message IDs in the network system, to the message ID of the sync message; determining a sync message target receiving time on a sync slave node; and triggering an interrupt to the processor responsive to receiving the sync message on a sync slave node in the controller area network to perform time adjustment on the sync slave node.

15 Claims, 8 Drawing Sheets

(56) References Cited

U.S. PATENT DOCUMENTS

| | | | |
|---|---|---|---|
| 2005/0066101 A1* | 3/2005 | Fuehrer | H04J 3/0655 710/300 |
| 2005/0071703 A1* | 3/2005 | Lee | G06F 11/1479 713/400 |
| 2008/0198868 A1* | 8/2008 | Fuehrer | G06F 1/14 370/442 |
| 2008/0273527 A1* | 11/2008 | Short | H04J 3/0655 370/364 |
| 2010/0054282 A1* | 3/2010 | Schirmer | G06F 1/12 370/503 |
| 2010/0180003 A1* | 7/2010 | Jiang | G06Q 10/06 709/208 |
| 2013/0238826 A1* | 9/2013 | Hartwich | H04J 3/0655 710/117 |
| 2015/0003443 A1* | 1/2015 | Koenigseder | H04W 40/20 370/350 |
| 2015/0063109 A1* | 3/2015 | Han | H04L 47/16 370/235 |
| 2015/0106541 A1* | 4/2015 | Southcombe | G06F 13/4221 710/110 |
| 2016/0072883 A1* | 3/2016 | Long | H04L 67/1095 709/219 |
| 2017/0003386 A1* | 1/2017 | Yurkov | G01S 11/14 |

OTHER PUBLICATIONS

Sunyajun: "TC1796—TTCAN Getting STartedon TC 1796-Board & Toolkits", Aug. 1, 2008 (Aug. 1, 2008), XP055408045, Retrieved from the Internet: URL: http://www.infineon.com/dgdl/ap2900612_TTCAN_GettingStarted.pdf?fileId=db3a30431c69a49d011cd7006a4d1316 [retrieved on Sep. 19, 2017].
European Search Report for EP Application No. 17168300.6 dated Sep. 27, 2017; 62 pages.

* cited by examiner

CONTROLLER AREA NETWORK SYNCHRONIZATION

BACKGROUND

The present disclosure relates to controller area networks, and more specifically, to controller area network nodes synchronization.

A controller area network (CAN) is a vehicle bus standard designed to allow microcontrollers and devices to communicate with each other. CAN networks include a message-based protocol that was originally designed for multiplex electrical wiring in road vehicles. Due to its real time and data collision avoidance properties, CAN has been widely used in the other industries including aerospace.

Typically, in nodes on a CAN bus (for example, the CAN discussed below with respect to FIG. 1), the periodic CAN application tasks running on microcontrollers have the same task cycle time by design, and each CAN node may transmit a group of messages (message burst) on the CAN bus and receive messages from the other nodes once every CAN task cycle. The periodic CAN messages are produced and consumed by the periodic CAN application tasks. However, since the CAN protocol does not provide accurate global time service and each node has its own clock, the CAN task cycles on the CAN nodes are not synchronized to each other, which makes the CAN task cycles with the message pack/unpack procedures in the CAN nodes and consequently message bursts on CAN bus drift away from each other over time.

This can cause overwritten messages and absent messages. The overwritten message occurs when two messages (with the same message identifier but possibly different settings for the same set of parameters inside), transmitted once in each of two consecutive CAN task cycles from a node, are received in one CAN task cycle on a receiving node. This phenomenon can result in a lost message on the receiving node, where either the older or the newer message gets dropped depending on the CAN application interface setup. The absent message occurs when a message, transmitted once every CAN task cycle from a transmission node, is supposed to be but is not received in a CAN task cycle on a receiving node, which can result in stale data from the previously received message being used by the applications. The jitters from different procedures executing on the microcontroller in the CAN node can worsen the effects of overwritten and absent message. CAN bus contention, where multiple CAN nodes attempt to transmit on the CAN bus at the same time and one or more CAN nodes are required to wait until the bus is free, can also worsen this effect. Lost and/or absent messages may not be tolerable in mission critical applications.

SUMMARY

According to an embodiment of the present invention, a computer-implemented method for synchronizing nodes on a controller area network is described. The method may include: identifying, via a processor, a node from a plurality of nodes as a sync master node; designating, via the processor, each of the remaining nodes as a sync slave node; designating, via the processor, the first message from the sync master node as a sync message; assigning, via the processor, the lowest number, among all the message IDs in the network system, to the message ID of the sync message; determining a sync message target receiving time on a sync slave node; and triggering an interrupt to the processor responsive to receiving the sync message on a sync slave node in the controller area network to perform time adjustment on the sync slave node.

According to another embodiment, an aircraft having a system for synchronizing nodes on a controller area node network system for synchronizing nodes on a controller area node network is described. The system may include a processor configured to: identify a node from a plurality of nodes as a sync master node; designate each of the remaining nodes as a sync slave node; designate the first message from the sync master node as a sync message; assign the lowest number, among all the message IDs in the network system, to the message ID of the sync message; determine a sync message target receiving time on a sync slave node; and trigger an interrupt to the processor responsive to receiving the sync message on a sync slave node in the controller area network to perform time adjustment on the sync slave node.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
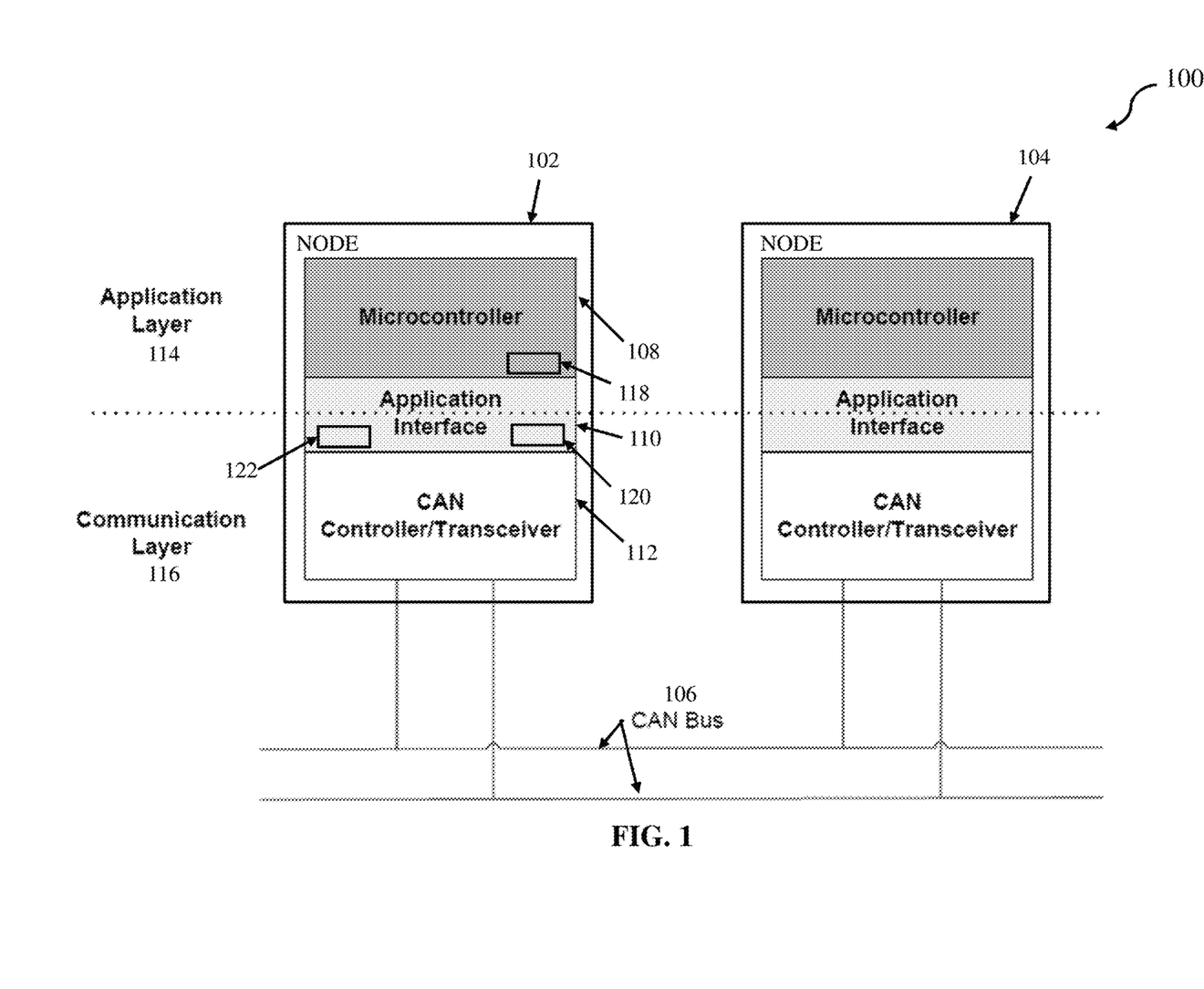
FIG. 1 depicts a block diagram of a conventional (unsynchronized) CAN communication network.

FIG. 1 is a logical block diagram of a conventional (unsynchronized) CAN 100, from the microcontroller application perspective, although physically the CAN controller may be part of the microcontroller. For the sake of simplicity, only two nodes 102 and 104 are depicted. It should be appreciated that CAN networks may include more than two nodes.

CAN is a serial bus standard for connecting Electronic Control Units [ECUs] also known as communication nodes (or simply "nodes"). From a high level, a node may include a communication layer 116 and an application layer 114, which separate, for each node in conventional (unsynchronized) CAN 100, a microcontroller 108 and a CAN controller/transceiver 112 (hereafter "CAN controller 112") via an application interface 110. Communication layer 116 may be configured to provide CAN protocol services. Application layer 114 may be configured to supply/consume data to/from communication layer 116. Application interface 110 may facilitate data transfer between a microcontroller 108 and a CAN controller 112.

A CAN node (e.g., CAN node 102) includes a microcontroller 108, an application interface 110, and a CAN controller 112. Microcontroller 108 may include a CAN application task 118. Application interface 110 may include one or more CAN receiving message boxes (or buffers) 122, and one or more CAN transmission message boxes (or buffers) 120. For the sake of brevity, message box is used for the illustration.

Microcontroller 108 may be a central processing unit, microprocessor, or host processor. Microcontroller 108 may be configured to decide what the received messages mean and what messages it wants to transmit. Other devices on an aircraft, including sensors, actuators and control devices can be connected to microcontroller 108. Microcontroller 108 may include one or more processors (not shown). Microcontroller 108 may be a hardware device for executing hardware instructions or software.

For the sake of brevity, in some embodiments, transmission or message transmission, transmitting or message transmitting, and transmit are abbreviated as Tx, and receiving or message receiving, and receive are abbreviated as Rx. A conventional (unsynchronized) CAN 100 may include individual nodes 102 and 104, connected by a CAN bus 106. Each node in a conventional CAN 100 can include a microcontroller, a CAN controller, and an application interface (as shown in node 102). For Rx, CAN controller 112 stores the received serial bits from CAN bus 106 until an entire message is available. Then CAN controller 112 may check the message integrity, and put the message body in a Rx message box 122 if the message integrity check passes. A CAN application task (e.g., CAN application task 118) running on microcontroller 108 may pick up a message body from a Rx message box 122, unpack the message body and make parameters from the received message available to the consumer applications running on the microcontroller 108. For Tx, the CAN application task 118 may pack the parameters to be transmitted into a CAN message body and put the message body in a CAN Tx message boxes 120. CAN controller 112 may pick up a message body from a Tx message box, add the message header and integrity check CRC to form a CAN message, and transmit the message on CAN bus 106 when the bus is free.

CAN application task 118 running on microcontroller 108 is commonly a periodic task, and performs packing procedure for Tx and unpacking procedure for Rx, among the other possible procedures, once every CAN task cycle. CAN application task 118 packs a set of parameters into a CAN message body and puts the message body in a CAN Tx message box 120. CAN application task 118 performs this packing procedure continuously until all the messages to be transmitted in a particular cycle are formed and put in the CAN Tx message boxes 120, while CAN controller 112 is picking up a message from a filled CAN Tx message box and transmitting the message on CAN bus 106. The CAN application task also picks up a message from a CAN Rx message box 122 and unpacks the message to a set of parameters. The CAN application task performs this unpacking procedure continuously until all the messages in Rx message boxes 122 are unpacked and parameters unpacked from the messages are available to the consumer applications on microcontroller 108.

CAN application task 118 running on microcontroller 108 can produce messages much faster than CAN controller 112 can transmit messages on CAN bus 106. As a result, by the time the CAN task is done packing and putting all the messages in CAN Tx message boxes 120, the CAN controller has only transmitted a few messages while the majority of the messages may be still waiting in CAN Tx message boxes 120. Due to the way the messages are produced and transmitted, the CAN messages from a node appear to be a burst of messages (a group of messages back to back with little time gap in between, described hereafter as a "message burst") on CAN bus 106. This optimizes the CAN bus bandwidth utilization, and allows CAN application task 118 to perform other procedures after packing procedure, such as the unpacking procedure for Rx messages, while CAN controller/transceiver 112 on the same node is still transmitting.

The periodic CAN application tasks in the nodes on a CAN bus can have the same task cycle time by design, and each CAN node transmits a group of messages (message burst) on the bus and receives certain messages from the other nodes once every its CAN task cycle. Tx messages are produced and Rx messages are consumed by the periodic CAN application tasks. However, since the CAN protocol does not provide accurate global time service and each node has its own clock, the CAN task cycles on the CAN nodes are not synchronized to each other, which makes the timing of CAN task cycles with the message pack/unpack procedures, and consequently the message bursts from the nodes on CAN bus, drift away from each other over time. This can cause overwritten and absent messages.

Figure 2:
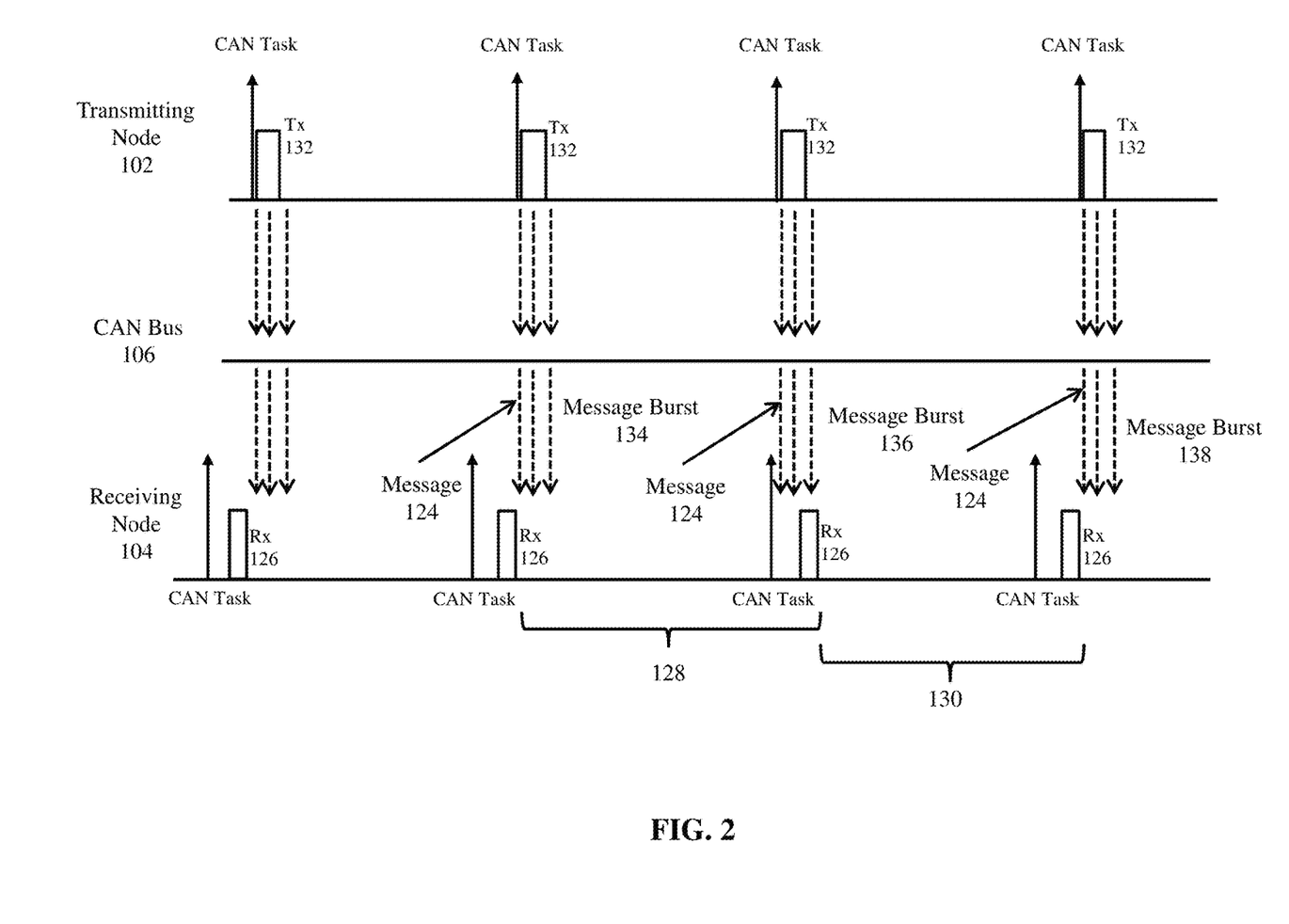
FIG. 2 depicts a diagram of a conventional CAN where overwritten and absent messages occur according to one embodiment.

FIG. 2 depicts a timing diagram of a conventional (unsynchronized) CAN to show overwritten and absent messages, according to one embodiment. For the sake of simplicity and brevity, the figure focuses on the CAN Tx on node 102 and the CAN Rx on node 104. Sequence 128 is an example of how CAN timing jitter and lack of synchronization may cause message 124 in message burst 134 and message 124 in message burst 136 from the transmitting node to be overwritten before Rx node 104 is able to unpack message 124 from message burst 134. Sequence 130 is an example of how CAN timing jitter and lack of synchronization may cause an absent message where none of message 124 in message burst 136 and message 124 in message burst 138 from the transmitting node is in a Rx message box. When CAN Rx procedure 126 unpacks the received messages, it finds out that Rx node 104 receives no new message for message 124.

It may be advantageous to provide a CAN node synchronization function configured to periodically transmit a synchronization message from a node, whereby all the other CAN nodes synchronize their message bursts with the sync message in such a way that message bursts from all the nodes on the CAN bus are evenly time spaced to enable application-level node-to-node deterministic data communication.

Figure 3:
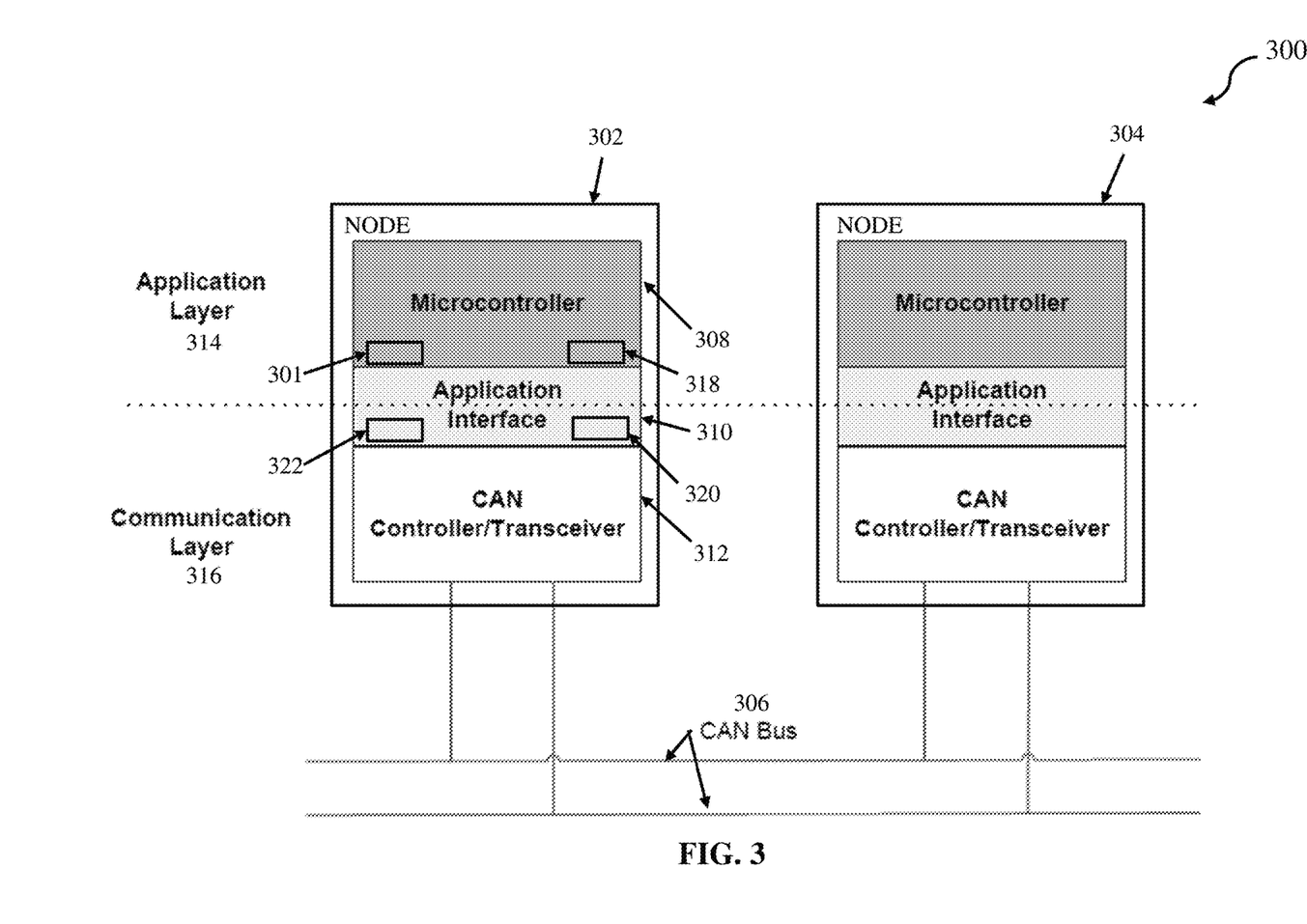
FIG. 3 depicts a block diagram with a CAN node synchronization function according to one embodiment.

FIG. 3 depicts a CAN configured with a CAN node synchronization function 301 (the CAN and synchronization function collectively referred to hereafter as "system 300"), according to one embodiment. System 300 may include a plurality of nodes including, for example, nodes 302 and 304. It is appreciated that system 300 may include more than two nodes.

A CAN node includes a communication layer 316 and an application layer 314, which separate, for each node in system 300, a microcontroller 308 and a CAN controller/transceiver 312 via an application interface 310. Communication layer 316 may be configured to provide CAN protocol services. Application layer 314 supplies/consumes data to/from communication layer 316. Application interface 310 may facilitate data transfer between microcontroller 308 and CAN transceiver 312. A CAN node (e.g., sync master node 302) includes a microcontroller 308, an application interface 310, and a CAN controller/transceiver 312. Microcontroller 308 may include a CAN application task 318. Application interface 310 may include one or more CAN Rx message boxes 322, and one or more Tx message boxes 320. Synchronization function 301 may be configured on each node in system 300.

According to some embodiments, system 300 may be configured to select a node in the network via the microcontroller (e.g., microcontroller 308) to serve as the synchronization master node. In the present example, network 300 has selected node 302 as the sync master node (synchronization master node). Sync master node 302, periodically sends a CAN sync message (not shown) e.g., once every CAN task cycle to each of the other CAN nodes.

Each of the other CAN nodes on CAN bus 306 may be configured as a sync slave node (synchronization slave node). The sync slave nodes (e.g., sync slave node 304) may also be configured with a CAN node synchronization function 301. Accordingly, each sync slave node may adjust its CAN task cycle time based on the point of time the sync message is received to move the start of its CAN task cycle with the Tx/Rx packing/unpacking procedures and consequently to move the message burst from the sync slave node so that the message bursts are evenly time-spaced on CAN bus 306. System 300 may configure CAN nodes using synchronization function 301 to render all the CAN nodes on CAN bus 306 to be contention free to enable application-level node-to-node deterministic data communication, e.g., from CAN applications running on microcontroller 308 on a node (e.g., sync master node 302) to the CAN applications running on microcontroller (not shown) on another node (e.g., sync slave node 304).

In some embodiments, the packing and unpacking procedures running on microcontroller 308 are all in one CAN application task 318. In CAN application task 318, the message packing procedure for Tx may run before the message unpacking procedure for Rx.

Figure 4:
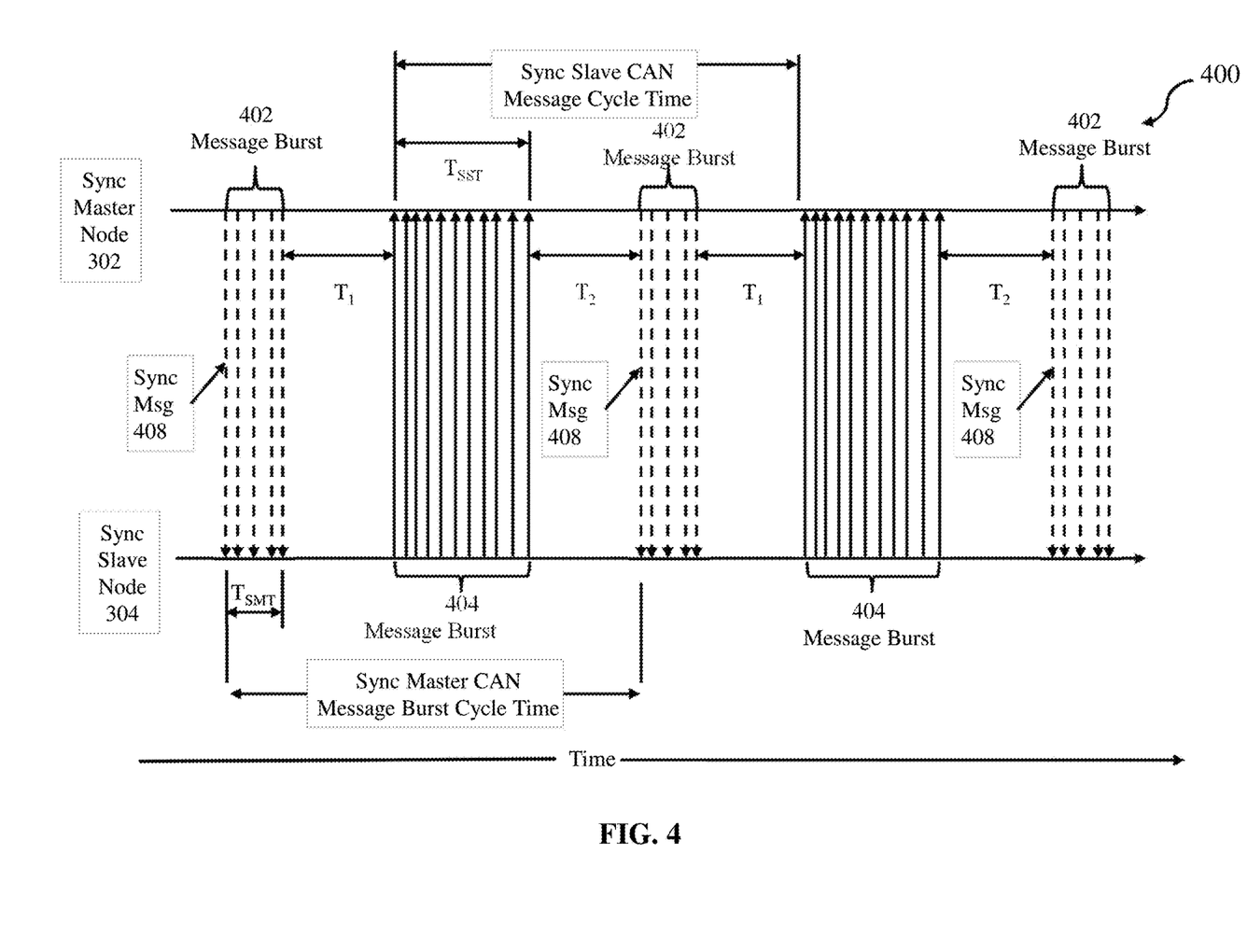
FIG. 4 depicts a diagram of message bursts in a synchronized CAN according to one embodiment.

Referring now to FIG. 4, a diagram of message bursts 402 and 404 in CAN node synchronization system 300 is depicted, according to one embodiment. For the sake of brevity, only two nodes (sync master node 302 and sync slave node 304) are shown, although system 300 may include multiple sync slave nodes 304. To produce even time spacing between message bursts on CAN bus 306, system 300 may configure one node to be the sync master node (shown in FIG. 4, for example, as sync master node 302), and configure the remaining node(s) in the network to be the sync slave node(s) (shown in FIG. 4, for example, as sync slave node 304).

For optimal operation, the point of time of transmitting a sync message 408 from sync master node 302, and consequently the point of time of receiving sync message 408 on sync slave node 304, may be made as accurate as possible. Therefore, sync message 408 may be the first message of its respective message burst 402 sent out from sync master node 302 to avoid the scenario that the message(s) queued before the sync message from the sync master node may need retransmission due to CAN bus contention which makes the sync message transmission start/end time inaccurate on CAN bus 306. Secondly, microcontroller 308 may assign sync message 408 with the lowest message ID among the messages transmitted from all the nodes on CAN bus 306 so that sync message 408 may have the highest priority on CAN bus 306 to always win the bus in case of bus transmission contention from the other nodes (e.g., sync slave node 304, etc.). Thirdly, an interrupt may be triggered on microcontroller 308 when the sync message is received and ready in a Rx message box 322 on sync slave node 304, and the time adjustment may be performed by microcontroller 308 on sync slave node 304 immediately, e.g., in the context of interrupt service routine in 301. A microcontroller in a CAN node can be configured to trigger interrupts at receiving one or more messages among all the Rx messages. In this invention, microcontroller 308 may be configured to trigger an interrupt at receiving the sync message on the sync slave node.

In FIG. 4, $T_{SMT}$ represents a message burst transmission time duration from sync master node 302 and $T_{SST}$ represents a message burst transmission time from sync slave node 304 in a two node CAN. $T_1$ represents the spacing time between the end of a message burst from sync master node 302 and the start of the following message burst from sync slave node 304. $T_2$ represents the spacing time between the end of a message burst from sync slave node 304 and the start of the following message burst from sync master node 302. According to some embodiments, system 300 may dynamically adjust the start of message bursts 404 from sync slave node 304 once per CAN application task cycle to make the message burst cycle on sync slave node 304 synchronize with that of sync master node 302 in such a way that the values of $T_1$ and $T_2$ stay equal within a predetermined threshold of error. A predetermined threshold of error may be, for example, 50 microseconds.

Figure 5:
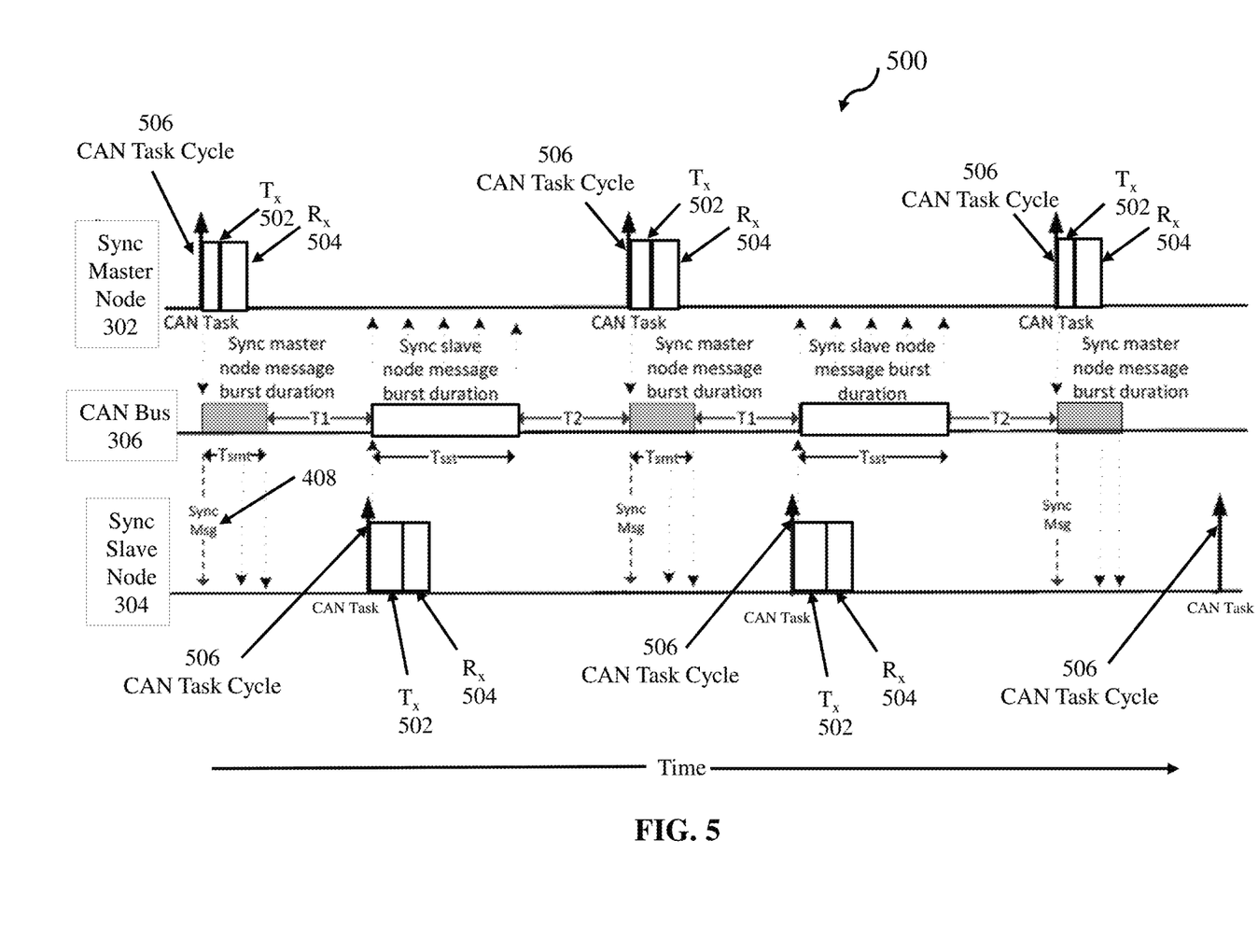
FIG. 5 depicts a timing diagram of CAN task periodic cycles, CAN task transmission and receiving procedures on the sync master and sync slave nodes, and message bursts on CAN bus according to one embodiment.

FIG. 5 depicts a two node CAN timing diagram of CAN task periodic cycles on the sync master and sync slave nodes, CAN task procedures of packing for Tx and unpacking for Rx and message bursts on a CAN bus according to one embodiment. Referring now to FIG. 5, Tx procedure 502 and Rx procedure 504 are depicted next to each other. Tx procedure 502 is followed by Rx procedure 504 on both sync master node 302 and sync slave nodes 304. Tx procedure 502 and Rx procedure 504 may be configured by microcontroller 308 as the early procedures among all the possible procedures in the CAN task in system 300. In some aspects, making CAN tasks Tx procedure 502 and Rx procedure 504 the early procedures in CAN task on sync master node 302 and sync slave nodes 304 may minimize jitters that may otherwise be caused by the procedures prior to the Tx/Rx procedures.

As shown in FIG. 5, sync message 408 may be the first message in the periodic message burst 402 from sync master node 302. The start of the message burst on CAN bus 306 from either sync master node 302 or sync slave node 304 is tied to the start of a Tx procedure 502 in CAN task by a small amount of time, from packing of the first message by microcontroller 308 to transmitting the message by CAN controller/transceiver 312. Thus, microcontroller 308 may adjust the start of a CAN task cycle 506 on the sync slave node to move the start of the message burst from the sync slave node. Since Tx procedures 502 in the CAN task for both sync master node 302 and sync slave node 304 only take a fraction of the node message burst period, there is enough time to finish Rx procedure 504 to unpack all the newly Rx messages before the next message burst from another node starts, when equal time-spaced message bursts are achieved on CAN bus 306. It is critical for Rx procedures 504 to finish on a node before the message burst from another node starts. Otherwise, a race condition between the Rx procedure on a node and a message transmission from another node may cause an overwritten message if transmission from another node wins the race or an absent message if the Rx procedure on the node wins the race, as illustrated in sequences 128 and 130 in FIG. 2.

Figure 6:
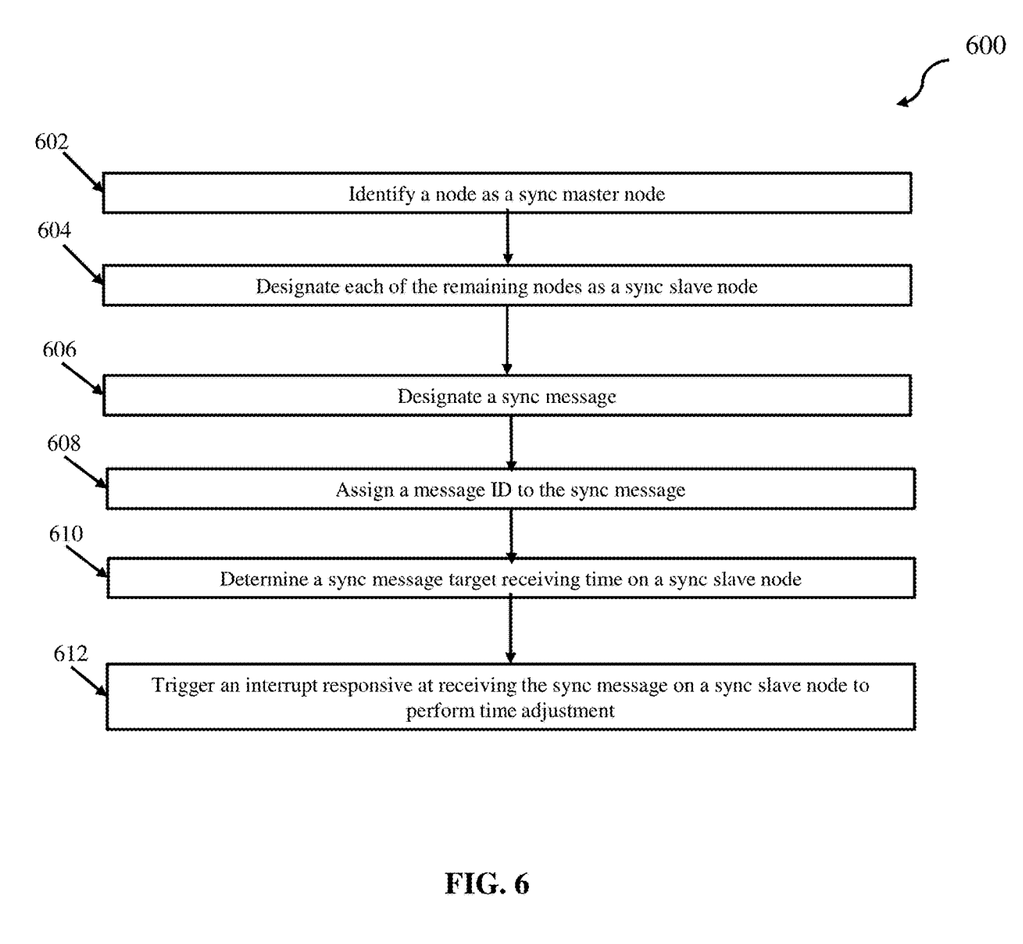
FIG. 6 depicts a flow diagram of a method for CAN node synchronization according to one embodiment.

FIG. 6 is a flow diagram of a method for CAN node synchronization, according to one embodiment. Referring now to FIG. 6, system 300 may identify a node as a sync master node 302, as shown in block 602.

As shown in block 604, system 300 may designate each of the remaining nodes as a sync slave node 304.

As shown in block 606, microcontroller 308 may designate the first message from sync master node 302 as a sync message 408, and assign a message ID to the sync message that is the lowest message ID from a plurality of messages in all the message bursts 402 and 404, as shown in block 608.

As shown in block 610, microcontroller 308 may determine an optimized spacing time duration $T_{spacing}$ between neighbor message bursts 402 and 404 and the sync message target receiving time $T_{target}$ relative to the start of the current CAN task cycle time 506 on a sync slave node. As shown in FIG. 5, the following equation holds for a two node CAN:

$$T_{cycle} = T_{sst} + T_2 + T_{smt} + T_1; \quad (1)$$

where $T_{cycle}$ is a transmission cycle duration equal and tied to the predetermined CAN task cycle time, $T_{smt}$ is the sync master message burst duration, and $T_{sst}$ is the sync slave message burst duration. According to some embodiments, a CAN analyzer and an oscilloscope may provide measurements for the sync master message burst duration ($T_{smt}$) and the sync slave message burst duration ($T_{sst}$). $T_1$ represents the spacing time between the end of a message burst from sync master node 302 and the start of the following message burst from sync slave node 304. $T_2$ represents the spacing time between the end of a message burst from sync slave node 304 and the start of the following message burst from sync master node 302. When $T_1$ is about equal to $T_2$, the (message burst from) sync master node 302 and the (message burst from) sync slave node 304 are optimally synchronized. Thus, replace $T_1$ and $T_2$ with $T_{spacing}$ in equation (1), $T_{spacing}$ for a two node CAN can be derived by:

$$T_{spacing} = (T_{cycle} - (T_{smt} + T_{sst}))/2; \quad (2)$$

In this invention, the sync message receiving time is defined as the sync message receiving time relative to CAN task cycle start time 506 on a sync slave node 304, which is $T_{sst} + T_2$, shown in FIG. 5. When $T_1 = T_2 = T_{spacing}$, the optimized sync message receiving time is achieved. According to some embodiments, the sync message target receiving time is defined as the optimal sync message receiving time relative to the start of CAN task cycle time 506 on a sync slave node 304, and is denoted as $T_{target}$ in this invention. Therefore, $T_{target}$ on the slave node for a two node CAN may be derived by:

$$T_{target} = T_{sst} + T_{spacing}. \quad (3)$$

Accordingly, system 300 may be configured with $T_{cycle}$ as a predefined CAN task cycle time by design, $T_{sst}$ and $T_{smt}$ as predetermined known time measurements, and $T_{spacing}$ and $T_{target}$ as derived values from the predefined value and the known measurements.

As shown in block 610, synchronization function 301 can be configured to trigger an interrupt to microcontroller 308 on sync slave node 304 upon receiving sync message 408 on sync slave node 304. Accordingly, synchronization function 301 may use the interrupt service routine to get the sync message receiving time (the time elapse from the start of the current CAN task cycle 506 to the interrupt occurrence) and compare the sync message receiving time to the sync message target receiving time on the sync slave node, and determine, based on the comparison, whether the sync message receiving time on the sync slave node occurs before or after the sync message target receiving time, and perform the time adjustment.

For example, if the sync message receiving time on the sync slave node is less than its sync message target receiving time, then the sync message receiving occurs before its target receiving time on the sync slave node, so synchronization function 301 on the sync slave node may decrease its current CAN task cycle time by a predefined time adjustment to make the CAN task's next cycle start time 506 occur earlier and consequently move the sync message receiving time on the sync slave node closer to its sync message target receiving time in the CAN task's next cycle. If the sync message receiving time on the sync slave node is greater than its sync message target receiving time, then the sync message receiving occurs after its target receiving time on the sync slave node, so synchronization function 301 on the sync slave node may increase its current CAN task cycle time by a predefined time adjustment to make the CAN task's next cycle start time 506 occur later and consequently move the sync message receiving time on the sync slave node closer to the sync message target receiving time in the CAN task's next cycle.

Figure 7:
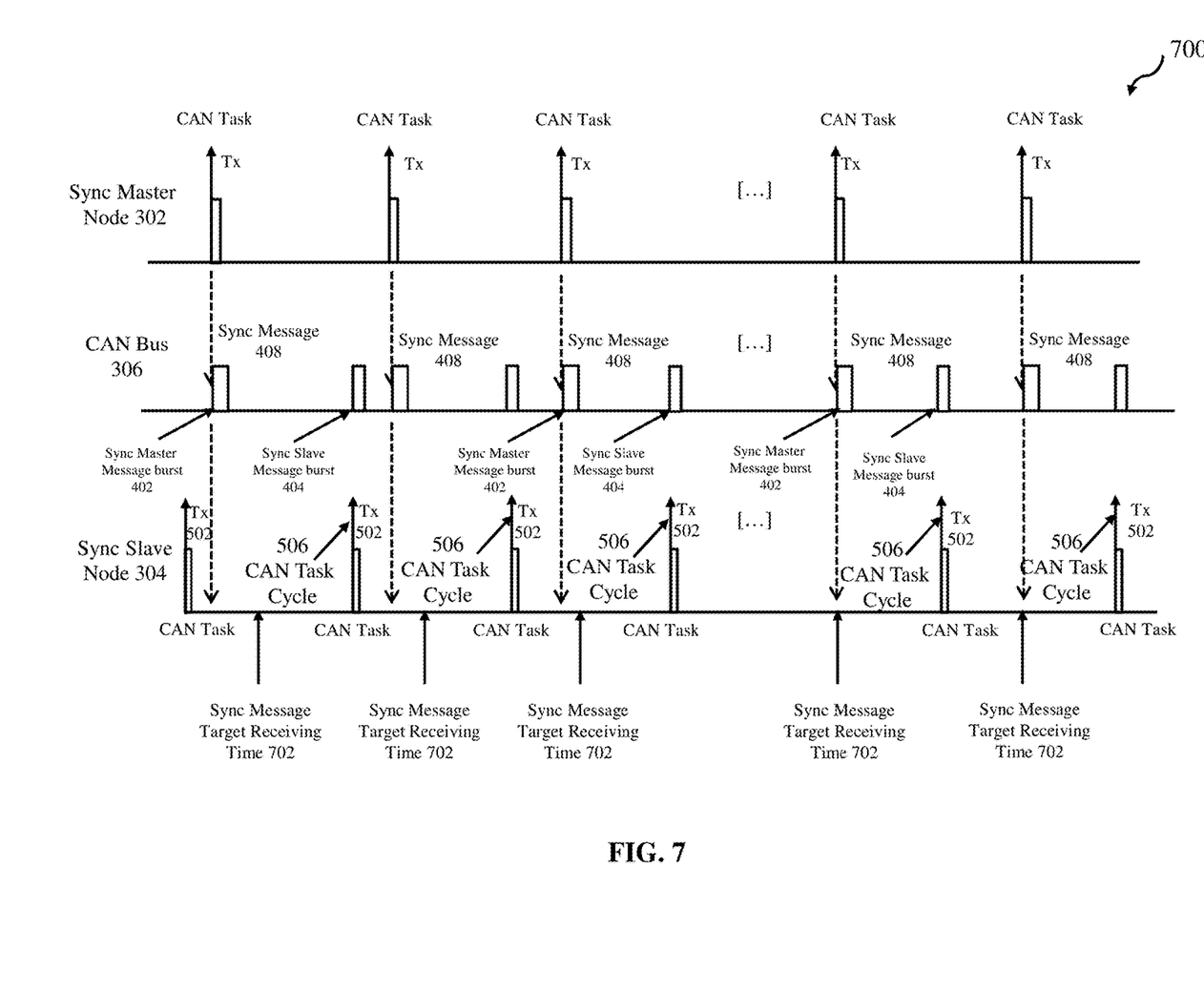
FIG. 7 depicts a diagram of CAN task cycle time adjustment in a synchronized CAN according to one embodiment.

FIG. 7 depicts a two node CAN timing diagram of CAN task cycle time adjustment on the sync slave node for CAN node synchronization system 300, according to one embodiment. Over time, CAN task cycle start time 506 on the sync slave node 304 may be adjusted by decreasing the CAN task cycle time with a predefined time adjustment each cycle. For example, the microcontroller may move the receiving time of sync message 408 relative to the start of the CAN task cycle time 506 on sync slave node 304 closer to sync message target receiving time 702 so that actual sync message receiving time 408 eventually converges with sync message target receiving time 702 on sync slave node 304. When sync message receiving time 408 on the sync slave node moves close to sync message target receiving time 702, the message bursts from sync slave node 304 is moving to the middle between its two neighbor sync master message bursts. The message bursts on CAN bus 306 are eventually evenly time spaced when sync message receiving time 408 and sync message target receiving time 702 converge.

For an N node CAN network, one node may be configured as the sync master node, and the remaining nodes may be configured as sync slave node 1, sync slave node 2, ..., sync slave node N−2, and sync slave node N−1. The order of message bursts on the CAN bus may be assigned as message bursts from the sync master node, sync slave node 1, sync slave node 2, ..., sync slave node N−2, and sync slave node N−1. The optimal neighbor message bursts spacing time $T_{spacing}$ may be derived by:

$$T_{spacing} = (T_{cycle} - (T_{smt} + T_{sst1} + T_{sst2} + \ldots + T_{sstN-2} + T_{sstN-1}))/N; \quad (4)$$

where $T_{cycle}$ is a transmission cycle duration equal and tied to the predetermined CAN task cycle time, $T_{smt}$ is the sync master node message burst duration, $T_{sst1}$ is the sync slave node 1 message burst duration, $T_{sst2}$ is the sync slave node 2 message burst duration, $T_{sstN-2}$ is the sync slave node N−2 message burst duration, and $T_{sstN-1}$ is the sync slave node N−1 message burst duration. According to some embodiments, a CAN analyzer and an oscilloscope may provide measurements for the sync master message burst duration ($T_{smt}$) and all the sync slave message burst durations ($T_{sst1}$), ($T_{sst2}$), ($T_{sstN-2}$), ..., and ($T_{sstN-1}$), etc. The maximum message burst duration from a node may be taken as its measured burst duration. This may accommodate CAN nodes that transmit messages of different periods and even aperiodic messages. Thus, a measured burst duration for a node may be considered as the maximum CAN bus bandwidth allocation for the node, and $T_{spacing}$ may be considered as the optimal spacing time between the CAN bus bandwidth allocations for any neighbor message bursts.

In general, $T_{target}$ on sync slave node J (J may take an integer value from 1 to N–1) $T_{target-J}$ may be derived by $$T_{target-J} = (T_{sstJ} + T_{sstJ+1} + \ldots + T_{sstN-2} + T_{sstN-1}) + (N-J)^* T_{spacing}. \quad (5)$$

For instance, for an N node CAN network, $T_{target}$ on sync slave node 1 may be derived and set to:

$$(T_{sst1} + T_{sst2} + \ldots + T_{sstN-2} + T_{sstN-1}) + (N-1)^* T_{spacing};$$

$T_{target}$ on sync slave node 2 may be derived and set to $$(T_{sst2} + T_{sst3} \ldots + T_{sstN-2} + T_{sstN-1}) + (N-2)^* T_{spacing};$$

$T_{target}$ on sync slave node N–2 may be derived and set to $$(T_{sstN-2} + T_{sstN-1}) + 2^* T_{spacing}; \text{ and}$$

$T_{target}$ on sync slave node N–1 may be derived and set to $$T_{sstN-1} + T_{spacing}.$$

For another instance, for a three node CAN network, $T_{spacing}$ may be set to $$(T_{cycle} - (T_{smt} + T_{sst1} + T_{sst2}))/3;$$

$T_{target}$ on sync slave node 1 may be set to $$((T_{sst1} + T_{sst2}) + 2^* T_{spacing}); \text{ and}$$

$T_{target}$ on sync slave node 2 may be set to $$(T_{sst2} + T_{spacing}).$$

The dynamic time adjustment process may occur once every CAN task cycle. According to some embodiments, system 300 may synchronize the sync message receiving time with the sync message target receiving time on a sync slave node (swinging back and forth around the target time by a very small time range). In some aspects, the adjustment time may be a small number, e.g., 1/100 of a CAN task cycle time, to synchronize the sync slave node with the sync master node in less than 100 times CAN cycle time duration (e.g., for a 5 millisecond CAN task cycle, the time adjustment may be set to 50 microseconds, so that it takes less than 500 milliseconds, or half second, to synchronize the sync message receiving time with the sync message target receiving time on a sync slave node).

Figure 8:
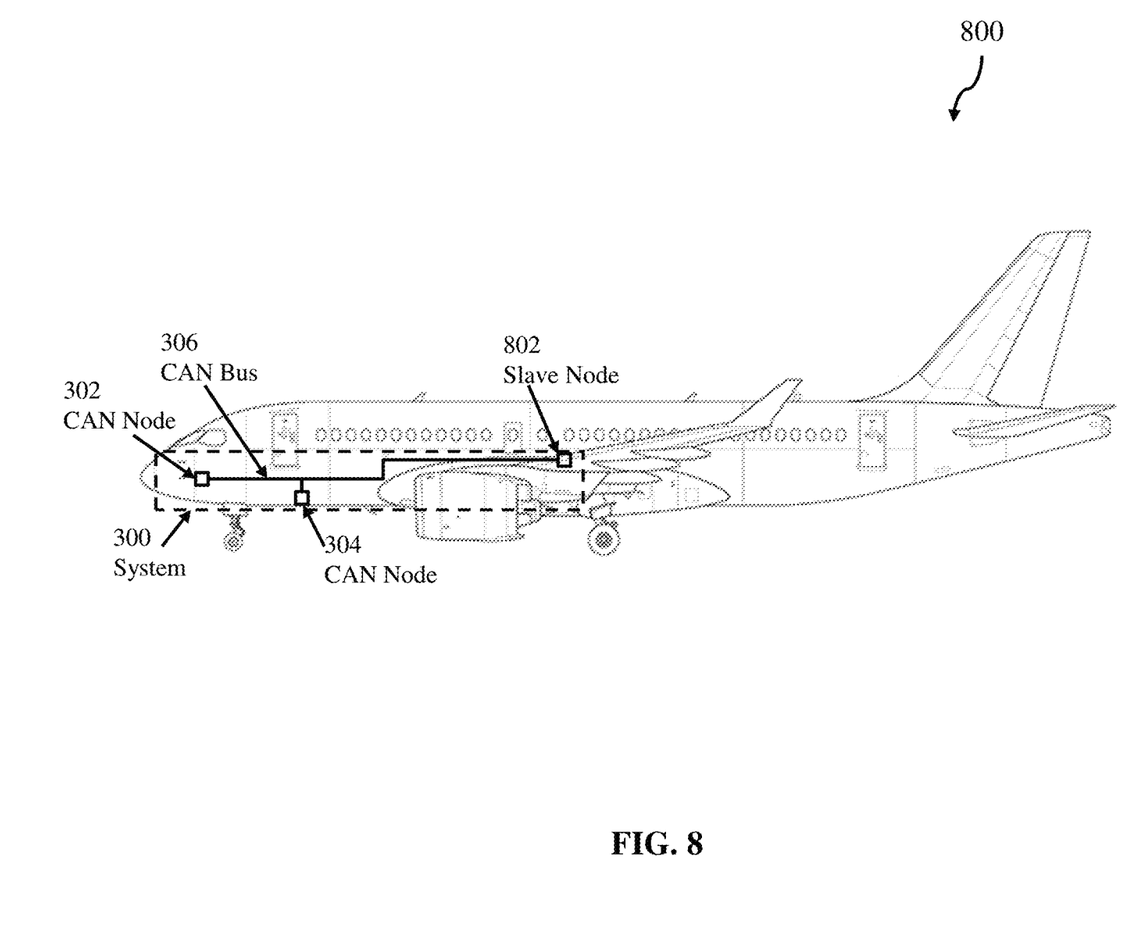
FIG. 8 depicts an aircraft having a CAN node synchronization application according to one embodiment.

FIG. 8 depicts an aircraft 800 having a CAN node synchronization system 300, according to one embodiment. Aircraft 800 may include a plurality of nodes, including, for example, sync master node 302, and a plurality of sync slave nodes 304 and 802, etc.

The flowchart and block diagrams in the Figures illustrate the architecture, functionality, and operation of possible implementations of systems and methods according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for synchronizing nodes on a controller area node (CAN) network comprising:
   identifying, via a processor, a node from a plurality of nodes as a sync master node;
   designating, via the processor, each of the remaining nodes as a sync slave node;
   designating, via the processor, the first message from the sync master node as a sync message;
   assigning, via the processor, the lowest number, among all the message identifications (IDs) in the network system, to a message identification (ID) of the sync message;
   determining a sync message target receiving time on a sync slave node; and
   triggering an interrupt to the processor responsive to receiving the sync message on a sync slave node in the controller area network to perform time adjustment on the sync slave node;
   wherein triggering an interrupt to the processor to perform time adjustment on a sync slave node comprises:
   triggering the interrupt at receiving the sync message on the sync slave node; and
   retrieving the sync message receiving time, the time elapse from the start of the current CAN task cycle to the interrupt occurrence, on the sync slave node; and
   comparing the sync message receiving time to the sync message target receiving time $T_{target}$ on the sync slave node; and
   determining, based on the comparison, whether sync message receiving time occurs before or after sync message target receiving time on the sync slave node.

2. The computer-implemented method of claim 1, wherein a spacing time duration between neighbor message bursts is optimally equal to each other within a small predefined error.

3. The computer-implemented method of claim 1, wherein an optimal spacing time duration $T_{spacing}$ between neighbor message bursts in an N node network is derived by:

$$T_{spacing} = (T_{cycle} - (T_{smt} + T_{sst1} + T_{sst2} + \ldots + T_{sstN-2} + T_{sstN-1}))/N; \text{ wherein:}$$

$T_{cycle}$ is a transmission cycle duration equal and tied to the predetermined CAN task cycle time;
$T_{smt}$ is a sync master node message burst duration;
$T_{sst1}$ is a sync slave node 1 message burst duration;
$T_{sst2}$ is a sync slave node 2 message burst duration;

$T_{sstN-2}$ is a sync slave node N−2 message burst duration; and $T_{sstN-1}$ is a sync slave node N−1 message burst duration; and wherein a sync message target receiving time $T_{target}$ on sync slave node 1, sync slave node 2, . . . , sync slave node N−2, or sync slave node N−1 in an N node network is derived by:

$$T_{target\_J} = (T_{sstJ} + T_{sstJ+1} + \ldots + T_{sstN-2} + T_{sstN-1}) + (N-J)^* T_{spacing}; \text{ wherein:}$$

J is a sync slave node identifier, i.e., $T_{target-1}$ represents $T_{target}$ on sync slave node 1, $T_{target-2}$ represents $T_{target}$ on sync slave node 2, . . . , $T_{target-N-2}$ represents $T_{target}$ on sync slave node N−2, $T_{target-N-1}$ represents $T_{target}$ on sync slave node N−1.

4. The computer-implemented method of claim 3, wherein the message burst durations for the sync master node and all the sync slave nodes are measured time durations.

5. The computer-implemented method of claim 1, further comprising moving the sync message receiving time close to the sync message target receiving time on a sync slave node by decreasing the current CAN task cycle time with a predefined time adjustment if the sync message receiving time occurs before the sync message target receiving time on the sync slave node or by increasing the current CAN task cycle time with a predefined time adjustment if the sync message receiving time occurs after the sync message target receiving time on the sync slave node.

6. A system comprising a processor operatively connected with a plurality of nodes, the processor configured to:
identify a node from the plurality of nodes as a sync master node in a controller area node (CAN) network;
designate each of the remaining nodes as a sync slave node;
designate the first message from the sync master node as a sync message;
assign the lowest number, among all message identifications (IDs) in the network system, to a message identification (ID) of the sync message;
determine a sync message target receiving time on a sync slave node; and
trigger an interrupt to the processor responsive to receiving the sync message on a sync slave node in the controller area network to perform time adjustment on the sync slave node;
wherein the processor is configured with an optimal spacing time duration $T_{spacing}$ between neighbor message bursts in an N node network derived by:

$$T_{spacing} = (T_{cycle} - (T_{smt} + T_{sst1} + T_{sst2} + \ldots + T_{sstN-2} + T_{sstN-1}))/N; \text{ wherein:}$$

$T_{cycle}$ is a transmission cycle duration equal and tied to the predetermined CAN task cycle time;
$T_{smt}$ is a sync master node message burst duration;
$T_{sst1}$ is a sync slave node 1 message burst duration;
$T_{sst2}$ is a sync slave node 2 message burst duration;
$T_{sstN-2}$ is a sync slave node N−2 message burst duration; and
$T_{sstN-1}$ is a sync slave node N−1 message burst duration; and wherein a sync message target receiving time $T_{target}$ on sync slave node 1, sync slave node 2, . . . , sync slave node N−2, or sync slave node N−1 in an N node network is derived by:

$$T_{target\_J} = (T_{sstJ} + T_{sstJ+1} + \ldots + T_{sstN-2} + T_{sstN-1}) + (N-J)^* T_{spacing}; \text{ wherein:}$$

J is a sync slave node identifier, i.e., $T_{target-1}$ represents $T_{target}$ on sync slave node 1, $T_{target-2}$ represents $T_{target}$ on sync slave node 2, . . . , $T_{target-N-2}$ represents $T_{target}$ on sync slave node N−2, $T_{target-N-1}$ represents $T_{target}$ on sync slave node N−1.

7. The system of claim 6, wherein a spacing time between neighbor message bursts is optimally equal to each other within a small predefined error.

8. The system of claim 6, wherein the processor is configured with the message burst durations for the sync master node and all the sync slave nodes as predetermined time measurements.

9. The system of claim 6, wherein the processor is further configured to:
trigger an interrupt at receiving the sync message on a sync slave node; and
retrieve the sync message receiving time, time elapse from the start of the current CAN task cycle to the interrupt occurrence, on the sync slave node;
compare the sync message receiving time to the sync message target receiving time $T_{target}$ on the sync slave node; and
determine, based on the comparison, whether sync message receiving time occurs before or after the sync message target receiving time on the sync slave node.

10. The system of claim 9, wherein the processor is further configured to move the sync message receiving time close to the sync message target receiving time on a sync slave node by decreasing the current CAN task cycle time with a predefined time adjustment if the sync message receiving time occurs before the sync message target receiving time on the sync slave node or by increasing the current CAN task cycle time with a predefined time adjustment if the sync message receiving time occurs after the sync message target receiving time on the sync slave node.

11. An aircraft comprising a processor configured to:
identify a node from a plurality of nodes as a sync master node in a controller area node (CAN) network in the aircraft;
designating, via the processor, each of the remaining nodes as a sync slave node;
designate the first message from the sync master node as a sync message;
assign the lowest number, among all message identifications (IDs) in the network system, to a message identification (ID) of the sync message; determine a sync message target receiving time on a sync slave node; and
trigger an interrupt to the processor responsive to receiving the sync message on the sync slave node in the controller area network to perform time adjustment on the sync slave node;
wherein the processor is further configured to:
trigger an interrupt at receiving the sync message on a sync slave node;
retrieve the sync message receiving time, time elapse from a start of a current CAN task cycle to an interrupt occurrence, on the sync slave node;
compare the sync message receiving time to the sync message target receiving time on the sync slave node; and
determine, based on the comparison, whether sync message receiving time occurs before or after the sync message target receiving time on the sync slave node.

12. The aircraft of claim 11, wherein a spacing time duration between neighbor message bursts is optimally equal to each other within a small predefined error.

13. The aircraft of claim 11, wherein the processor is configured with an optimal spacing time $T_{spacing}$ between neighbor message bursts in an N node network derived by:

$$T_{spacing} = (T_{cycle} - (T_{smt} + T_{sst1} + T_{sst2} + \ldots + T_{sstN-2} + T_{sstN-1}))/N;$$ wherein:

$T_{cycle}$ is a transmission cycle duration equal and tied to the predetermined CAN task cycle time;
$T_{smt}$ is a sync master node message burst duration;
$T_{sst1}$ is a sync slave node 1 message burst duration;
$T_{sst2}$ is a sync slave node 2 message burst duration;
$T_{sstN-2}$ is a sync slave node N−2 message burst duration; and
$T_{sstN-1}$ is a sync slave node N−1 message burst duration; and wherein a sync message target receiving time $T_{target}$ on sync slave node 1, sync slave node 2, ..., sync slave node N−2, or sync slave node N−1 in an N node network is derived by:

$$T_{target-J} = (T_{sstJ} + T_{sstJ+1} + \ldots + T_{sstN-2} + T_{sstN-1}) + (N-J) * T_{spacing};$$ wherein:

J is a sync slave node identifier, i.e., $T_{target-1}$ represents $T_{target}$ on sync slave node 1, $T_{target-2}$ represents $T_{target}$ on sync slave node 2, ..., $T_{target-N-2}$ represents $T_{target}$ on sync slave node N−2, $T_{target-N-1}$ represents $T_{target}$ on sync slave node N−1.

14. The aircraft of claim 13, wherein the processor is configured with the message burst durations for the sync master node and all the sync slave nodes as predetermined time measurements.

15. The aircraft of claim 11, wherein the processor is further configured to move the sync message receiving time close to the sync message target receiving time on a sync slave node by decreasing the current CAN task cycle time with a predefined time adjustment if the sync message receiving time occurs before the sync message target receiving time on the sync slave node or by increasing current CAN task cycle time with a predefined time adjustment if the sync message receiving time occurs after the sync message target receiving time on the sync slave node.

* * * * *